US005382155A

United States Patent [19]

Boix Jaen

[11] Patent Number: 5,382,155

[45] Date of Patent: Jan. 17, 1995

[54] MOLDS FOR FORMING CARDBOARD BOXES

[75] Inventor: Jose Boix Jaen, Elche, Spain

[73] Assignee: Boix Maquinaria, S.A., Elche, Spain

[21] Appl. No.: 92,194

[22] Filed: Jul. 15, 1993

[30] Foreign Application Priority Data

Jul. 16, 1992 [ES] Spain .................................... 9201493

[51] Int. Cl.⁶ ...................... B29C 43/04; B29C 43/36; B29C 43/50

[52] U.S. Cl. .................................... 425/577; 249/158; 249/182; 249/184; 425/394; 425/398; 425/414; 425/422; 425/436 R; 425/441

[58] Field of Search ............... 249/155, 156, 158, 178, 249/182, 184; 425/127, 577, 394, 398, 412, 414, 422, 436 R, 436 RM, 441, 453

[56] References Cited

U.S. PATENT DOCUMENTS

| | | | |
|---|---|---|---|
| 1,100,452 | 6/1914 | Stehm | 249/158 |
| 1,167,797 | 1/1916 | Clawson | 249/183 |
| 2,688,788 | 9/1954 | Archer | 249/157 |
| 3,292,216 | 12/1966 | Colombo | 249/158 |
| 3,877,673 | 4/1975 | Bisinella et al. | 249/182 |
| 4,465,257 | 8/1984 | Schimmel | 249/182 |
| 4,529,162 | 7/1985 | Tsujuki | 249/158 |
| 5,256,129 | 10/1993 | Jaen | 493/171 |

*Primary Examiner*—Khanh Nguyen
*Attorney, Agent, or Firm*—Darby & Darby

[57] ABSTRACT

The mold that belongs to a cardboard box forming machine is comprised of four forming corners, equal to each other, assembled in such a way that they can be moved longitudinally and transversally in order to carry out the adjustment of length as well as width of the boxes to be formed. The adjustment of length is achieved as a result of the corners being assembled on bushings threaded on spindles, each one of the latter having two sections threaded in a different direction so that the rotation of the former involves contrary movement of each pair of forming corners assembled on each spindle. The adjustment of width is achieved on the grounds of movement of said forming corners along linear guides upon which corresponding bridges slide. Forming corners are also completed with means retaining the box during its formation and pressing means for gluing of the corresponding laps.

4 Claims, 3 Drawing Sheets

MOLDS FOR FORMING CARDBOARD BOXES

FIELD OF THE INVENTION

As is expressed in the title of this specification, the present invention refers to a series of improvements introduced in molds for forming cardboard boxes, whose improvements permit varying the dimensions of the corresponding mold on the grounds of simple solutions, offering a high degree of versatility taking into account the numerous sizes of boxes existing on the market.

BACKGROUND OF THE INVENTION

As is known, the forming of cardboard boxes is done by means of molds between which a sheet from which the box itself is obtained is placed in such a way that by means of an ascending/descending core the cardboard sheet is pushed against the mold, causing the forming of the box, the box being expelled when another cardboard sheet is placed upon the same mold to form another box.

The variation of dimension in the cores responsible for introducing the box inside the mold, can be said to be solved by some manufactures, and among them, the applicant firm itself, by using a core with a special structure and which is claimed in patent of invention Spanish application P-9200153 which corresponds to U.S. Pat. No. 5,256,129, having some extendible wings among other characteristics.

However, the adjustment of the size of molds has not yet been effectively solved and though mechanism tending to adjust the size of vary the dimensions of molds have been provided for, such mechanisms have the problem of malfunctioning, aside from the fact that they are based on very complex mechanisms.

DESCRIPTION OF THE INVENTION

The object of the invention consists of some improvements applied to known molds, making it possible to adjust the dimensions thereof so that they adapt to any box size existing on the market.

The improvements are based on some simple mechanisms that make it possible to adjust the mold to adapt them to different box lengths, and on the other hand, they make it possible to adjust the mold to different box widths.

In this sense, the device that permits adjustment of the length of the box is comprised of a double thread spindle upon which some cylinders linked to each one of the forming corners of the mold slide, while the device adjusting the width is comprised of two linear guides upon which respective bridges slide, all in such a way that by means of the operation of some cylinders movement of the devices can take place to carry out repeated adjustment and adaptation to different box lengths and widths.

In order to complete the description that is going to be made hereinafter and for the purpose of providing a better understanding of the features of the invention, a set of drawings on the grounds of which the innovations and advantages of the cardboard box forming molds will be more easily understood, are attached hereto. They are in accordance with the improvements, object of the invention.

DESCRIPTION OF THE PREFERRED EMBODIMENT

Figure 1:
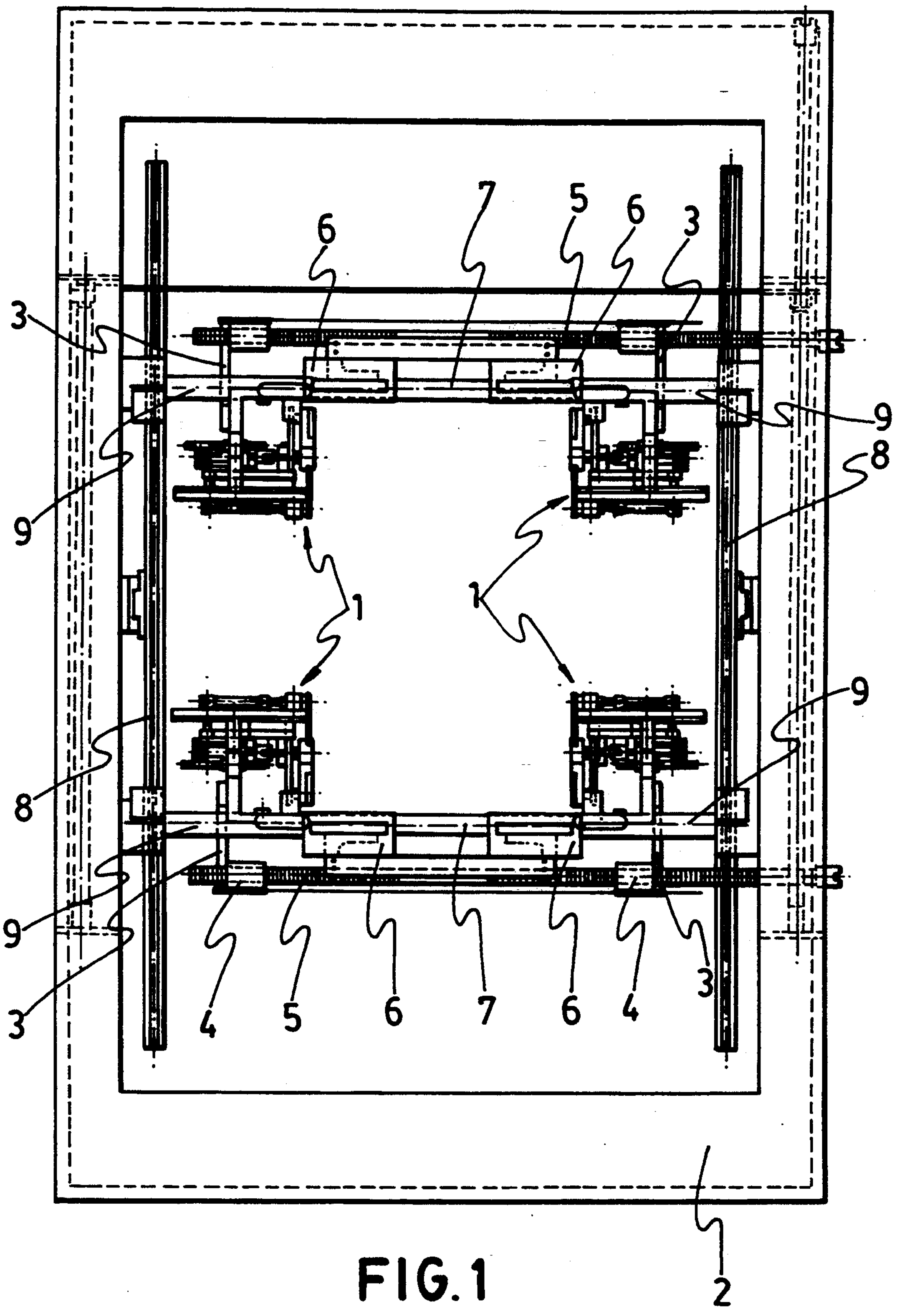
FIG. 1 is a plan view of the mold with the improvements of the invention.
Figure 2:
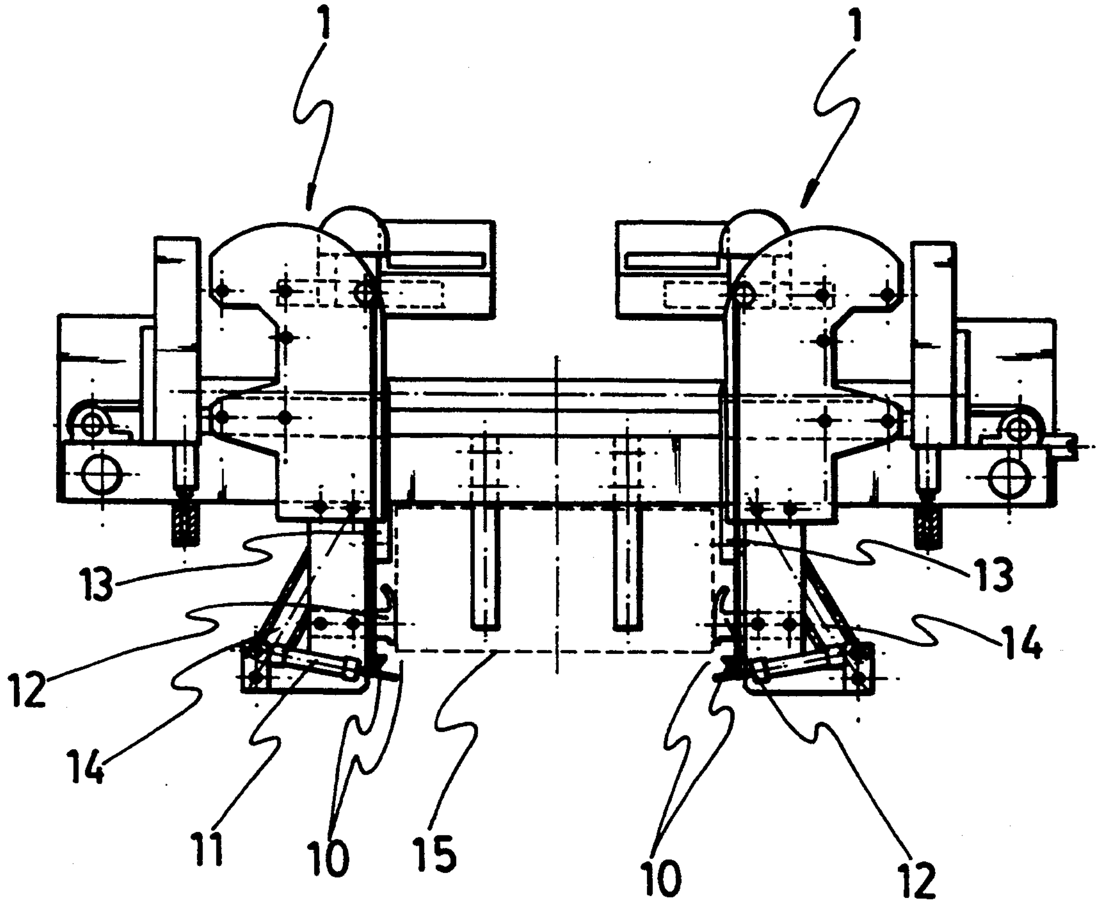
FIG. 2 is a section view corresponding to the cutting Line A—A of FIG. 1, showing the pneumatic mechanism responsible for retaining the box once formed.

As can be seen in the figures, the molds for forming cardboard boxes made in accordance with the improvements of the invention, include four forming corners 1 equal to each other, that form part of that which can be considered a box forming machine, whose general frame corresponds to reference 2, it being provided for that these forming corners 1, and through some arms, are linked to the respective bushings 4 assembled in a threaded manner on a spindle, all so that each pair of forming corners is mounted on a spindle 5 as can be clearly seen in FIG. 1, spindle as of whose center there is a thread in a different direction, so that when the same is actuated the forming corners 1 move in opposite directions, thus permitting the length of the box corresponding to reference 15 in FIG. 2 to be adjusted. The cited forming corners 1 sustain movement by some slides 6 that are slided by a guide 7.

In this way, depending on the movement in direction of the other of the forming corners 1, the length of the box to be formed will be adjusted.

Adjustment of the width is achieved by means of another device comprised of a pair of linear guides 8 upon which bridges 9 slide, whereby movement will be carried out in this case in a direction perpendicular to the one cited above, thus permitting the width of the box to be formed to be adjusted.

When the box pushed by the corresponding core is placed upon the mold, the box is retained by some bottom supports 10 operated by a cylinder 11, in such a way that when the rod of the cylinder 11 is drawn back the supports 10 are in the position represented in FIG. 2, permitting the formed box 15 to drop. Now then, when the rod of the cylinder 11 emerges outside the supports 10 move and define the fastening or retaining means of the box itself 15, during forming of the box.

The mechanism also has some retaining slippers 12, as well as some pressing devices 13 that are operated by corresponding cylinders 14, in such a way that these pressing devices 13 manage to press the flaps during the forming of the box, for the gluing of the same to the corresponding sides or front ends.

Figure 3:
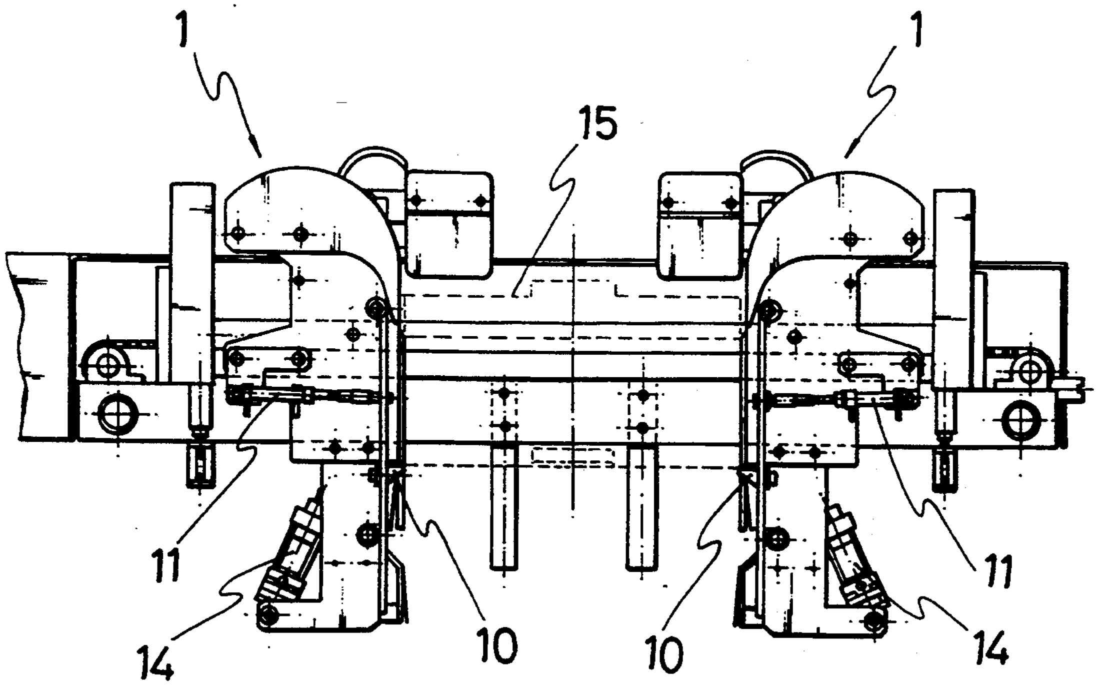
FIG. 3 is a view like the previous one, with the box retaining cylinders located in a different place, having the same purpose.

Finally, the fact that the cylinders 11 operating the supports 10 to retain the boxes 15 can be assembled in a position higher up than the one shown in FIG. 2, in other words, higher up as is represented in FIG. 3, maintaining the same purpose, is worthy of mention.

What is claimed:

1. A box forming machine comprising:

a frame;

four corner forming members being mounted on said frame;

a pair of spindles being rotatably connected to said frame, each of said pair of spindles have a first threaded portion and a second oppositely threaded portion, two of said corner forming members being slidably connected to each of said pair of spindles by a pair of bushings, one of said bushings being disposed about said first threaded portion and a second one of said bushings being disposed about said second oppositely threaded portion such that rotation of said spindle causes said two of said corner forming members to move in an opposite linear direction to achieve an adjustment in the length of a box to be formed;

a pair of linear guides being connected to said frame, two of said corner forming members being slidably connected to each of said pair of linear guides by a pair of bridges to cause said two of said corner forming members to move in an opposite linear direction to achieve an adjustment in the width of a box to be formed.

2. The box forming machine according to claim 1, wherein each of the four forming members includes a retaining slipper and a bottom support to fasten the corresponding box when it is being formed, each one of said retaining slipper and said bottom support being connected to the end of a rod corresponding to an operating cylinder that is moveable from a first fastening position to a second releasing position where the box is released once the box has been formed.

3. The box forming machine accordingly to claim 2, wherein each of the four forming members also include a pressing element for pressing the corresponding flaps of the box when the box is being formed, said pressing element being operated by means of a corresponding cylinder.

4. The box forming machine according to claim 1, wherein each of the four forming members also include a pressing element for pressing the corresponding flaps of the box when the box is being formed, said pressing element being operated by means of a corresponding cylinders.

* * * * *